US012792530B2

(12) United States Patent
Wurjantara et al.

(10) Patent No.: US 12,792,530 B2
(45) Date of Patent: Nov. 10, 2026

(54) SYSTEM AND METHOD FOR REQUESTING MEMORY ACCESS

(71) Applicant: At-memory Computing LP, Wilmington, DE (US)

(72) Inventors: Wisnu Wurjantara, Toronto (CA); Itay Franko, Toronto (CA); Dustin T. Griesdorf, Kitchener (CA)

(73) Assignee: At-memory Computing LP, Wilmington, DE (US)

( * ) Notice: Subject to any disclaimer, the term of this patent is extended or adjusted under 35 U.S.C. 154(b) by 0 days.

(21) Appl. No.: 18/795,843

(22) Filed: Aug. 6, 2024

(65) Prior Publication Data

US 2026/0044459 A1 Feb. 12, 2026

(51) Int. Cl.
*G06F 13/16* (2006.01)
*G06F 13/28* (2006.01)
*G06F 13/40* (2006.01)

(52) U.S. Cl.
CPC .......... *G06F 13/1631* (2013.01); *G06F 13/28* (2013.01); *G06F 13/4027* (2013.01)

(58) Field of Classification Search
None
See application file for complete search history.

(56) References Cited

U.S. PATENT DOCUMENTS 5,832,291 A * 11/1998 Rosen ................ G06F 15/8023 712/18
5,960,211 A * 9/1999 Schwartz ................ G06F 15/80 712/15
6,145,072 A * 11/2000 Shams .............. G06F 15/17343 710/2
8,069,279 B2 * 11/2011 Go .......................... G06F 13/28 709/212
8,271,700 B1 * 9/2012 Annem ................... G06F 13/28 710/22
8,407,167 B1 * 3/2013 Abts ................. G06F 15/17312 706/13
2007/0005825 A1 * 1/2007 Henson ............... G06F 13/1694 710/22
2008/0222317 A1 * 9/2008 Go .......................... G06F 13/28 710/22
2019/0244086 A1 * 8/2019 Franca-Neto .......... G06N 3/063
2022/0137843 A1 * 5/2022 Vogelsang ............ G06F 3/0673 711/106
2023/0153587 A1 * 5/2023 Vogelsang ............. G11C 5/025 706/25
2025/0077409 A1 * 3/2025 Punniyamurthy .... G06F 12/023

* cited by examiner

*Primary Examiner* — Yaima Rigol
(74) *Attorney, Agent, or Firm* — Mendelsohn Dunleavy, P.C.; Steve Mendelsohn

(57) ABSTRACT

An example device includes a bank of processing elements; a high bandwidth memory module in communication with the bank of processing elements and including a plurality of channels of memory; a plurality of bridges corresponding to the plurality of channels of memory, each bridge configured to connect a designated channel of the channels of memory to a designated vector of processing elements in the bank and including a bridge controller configured to: in response to a request for a memory access for a processing operation, perform the memory access to retrieve a data value from the designated channel according to the request; and provide the data value to a processing element in the designated vector to process according to the processing operation.

10 Claims, 4 Drawing Sheets

SYSTEM AND METHOD FOR REQUESTING MEMORY ACCESS

FIELD

The specification relates generally to memory access requests, and more particularly to memory access requests from a high bandwidth memory.

BACKGROUND

High bandwidth memory (HBM) is a memory chip capable of storing large amounts of data and therefore may be useful for computational applications requiring large amounts of data, such as large-language models (LLMs). However, retrieval of data values to a central cache may not utilize the full bandwidth that an HBM is capable of.

SUMMARY

According to an aspect of the present specification an example device includes: a bank of processing elements; a high bandwidth memory module in communication with the bank of processing elements and including a plurality of channels of memory; a plurality of bridges corresponding to the plurality of channels of memory, each bridge configured to connect a designated channel of the channels of memory to a designated vector of processing elements in the bank and including a bridge controller configured to: in response to a request for a memory access for a processing operation, perform the memory access to retrieve a data value from the designated channel according to the request; and provide the data value to a processing element in the designated vector to process according to the processing operation.

According to another aspect of the present specification, an example method includes: initiating, at a controller, a processing operation; identifying a memory access request to retrieve a target data value; processing, by a bridge controller of a bridge, the memory access request to retrieve the target data value from a designated channel of a high bandwidth memory connected to the bridge; and providing the target data value to a processing element in a designated vector connected to the bridge to process according to the processing operation.

BRIEF DESCRIPTION OF DRAWINGS

Implementations are described with reference to the following figures, in which.

DETAILED DESCRIPTION

High bandwidth memory (HBM) chips include an array of individual memory, such as double data rate (DDR) memory to increase the bandwidth capabilities of the memory. However, often, such memory is accessed by retrieving target data values to a centralized cache and then distributing the data values from the centralized cache to the requesting source.

In an accelerator architecture which is formed of an array of compute units or processing elements, the requesting processing element may be far from the centralized cache, and hence the path to provide the data value to the requesting processing element may be long, thereby increasing processing time. Additionally, while the HBM chip has a high bandwidth by nature of the arrayed structure of the memory chips, the retrieval process to a centralized cache limits the bandwidth which may be utilized at a given time.

According to the present disclosure, the memory access requests are initiated by a bridge controller rather than the processing elements themselves. Therefore, the bridge controller may coordinate the distribution of the data values to the processing elements to reduce path lengths, and the processing elements may simply act as recipients rather than actively requesting data values. Further, each bridge corresponds to one channel of the HBM to increase the rate at which data may be retrieved from the HBM. Additionally, the bridge may be configured to generate direct memory access (DMA) descriptors in alternating sets to further optimize retrieval of data from the HBM, as further described herein.

Figure 1:
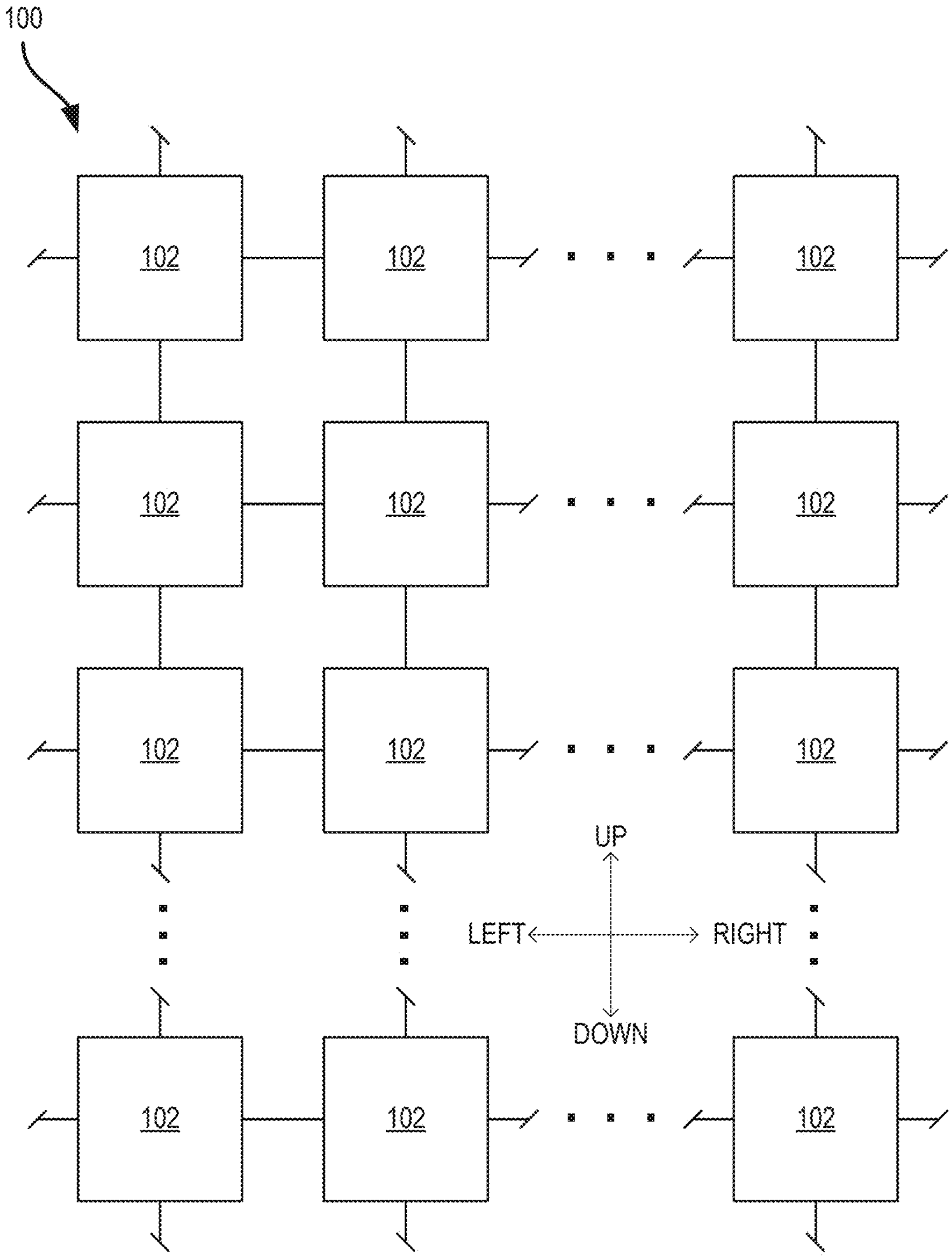
FIG. 1 depicts a schematic diagram of an example computing device configured with a bridge for performing memory access requests from a high bandwidth memory.

FIG. 1 shows an example computing device 100. The computing device 100 includes a plurality of banks 102 of processing elements. The banks 102 may be operated in a cooperative manner to implement a parallel processing scheme, such as a SIMD (single instruction/multiple data) scheme. For example, at a low level, the computing device 100 operates according to SIMD principles, within a bank, row, or other grouping of processing elements, where such groupings may be referred to as compute units. A compute unit may be configured to perform a particular processing objective, and such arrangements may provide for flexibility in how a particular operation is performed. At a high level, compute units communicate via a dataflow spatial architecture that is akin to a mesh network. The computing device 100 may be deployed to implement operations for a neural network computation, artificial intelligence (AI) program, large-language models (LLMs), machine vision programs, or similar.

The banks 102 may be arranged in a regular rectangular grid-like pattern, as illustrated. For sake of explanation, relative directions mentioned herein will be referred to as up, down, vertical, left, right, horizontal, and so on. However, it is understood that such directions are approximations, are not based on any particular reference direction, and are not to be considered limiting. Any practical number of banks 102 may be used. Limitations in semiconductor fabrication techniques may govern. In some examples, 512 banks 102 are arranged in a 32-by-16 grid.

A bank 102 may include an array of processing elements or PEs, as will be described further herein. The bank 102 itself may be a computing device, which may be termed a SIMD or at-memory computing device. U.S. Pat. No. 11,881,872, which is incorporated herein by reference, may be referenced for additional details concerning processing elements and banks thereof. More generally, the computing device 100 includes a plurality of processing elements, in which subsets of the processing elements may be configured to operate in SIMD fashion. The device 100 may include hundreds, thousands, or more processing elements.

Instructions and/or data may be communicated to/from the banks 102 via an input/output (I/O) bus or buses, which may be implemented in one or more segments. The I/O bus(es) may allow communication among banks 102 in a vertical direction, in a horizontal direction, and may be restricted to immediately adjacent banks 102 or may extend to further banks 102 in either the vertical or horizontal directions.

The computing device 100 may include a main processor (not shown) to communicate instructions and/or data with the banks 102 via the 1/O buses, manage operations of the banks 102, and/or provide an I/O interface for a user, network, or other device. The I/O buses may include a Peripheral Component Interconnect Express (PCIe) interface or similar.

Figure 2:
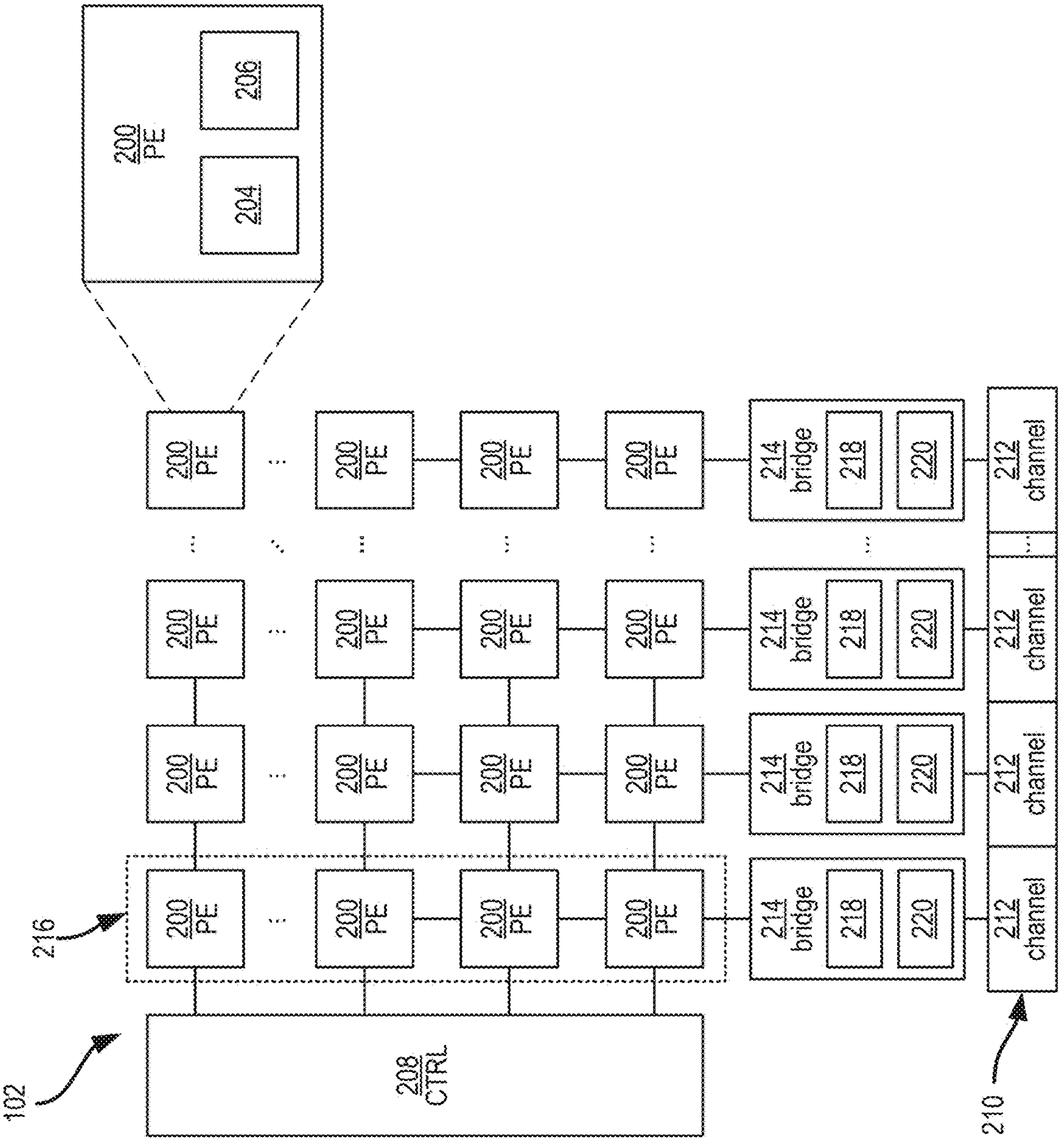
FIG. 2 depicts a schematic diagram of an example a bank of processing elements in the computing device of FIG. 1.

Referring now to FIG. 2, one of the banks 102 is depicted in greater detail. In particular, each bank 102 includes an array of processing elements or PEs 200. Processing elements 200 may be logically and, optionally, physically arranged in a two-dimensional array. Such an array may be considered to have rows and columns.

Each processing element 200 includes operational circuitry 204 to perform operations, such as multiplying accumulations. For example, each processing element 200 may include a multiplying accumulator and supporting circuitry. The processing element 200 may additionally or alternatively include an arithmetic logic unit (ALU) or similar processing or logic circuitry to perform desired operations.

Each processing element 200 includes or is connected to working memory 206 (e.g., random-access memory or RAM) dedicated to that processing element 200.

A processing element 200 may be connected with one or more neighboring processing elements 200 to share data and instructions. Processing element interconnections may be provided in the row direction, the column direction, or both.

The computing device 100 further includes a controller 208 connected to the processing elements 200 of each bank 102. A controller 208 is a processor (e.g., microcontroller, etc.) that may be configured with instructions to control the connected processing elements 200. The controller 208 is dedicated to the processing elements 200 of the bank 102 it serves. The controller 208 may be considered part of the bank 102 or may be considered external to the bank 102.

The controller 208 controls the connected processing elements 200 to perform the same operation on different data contained in each processing element 200. The controller 208 may further control the loading/retrieving of data to/from the processing elements 200, control the communication among processing elements 200, and/or control other functions for the processing elements 200. Any suitable number of controllers 208 may be provided to control the processing elements 200. Controllers 208 may be connected to each other for mutual communications. Controllers 208 may be arranged in a hierarchy, in which, for example, a main controller controls sub-controllers, which in turn control subsets of processing elements 200.

In some applications, such as to implement an LLM, the computing device 100 may store large volumes of data (e.g., representing tokens, vectors or the like in an LLM) for reference during operations. Accordingly, to store the data, the computing device 100 may include a high bandwidth memory (HBM) 210 configured to communicate with each bank 102. The HBM 210 may be considered part of the bank 102 or it may be considered external to the bank 102.

In particular, the HBM 210 may be constructed as an array or stack of synchronous dynamic random-access memory (SDRAM), such as double data rate (DDR) SDRAM to further increase the bandwidth of the HBM 210. In particular, each SDRAM module is configured to act as a channel 212 of the HBM 210. Accordingly, the HBM 210 may include as many channels 212 as SDRAM modules. In some examples, each DDR SDRAM module may operate two channels 212 which may function substantially independently of one another.

In typical access requests to retrieve data from the HBM 210, a centralized HBM controller may process the access request, and the data may be returned to a centralized cache to be distributed to the requesting source. Accordingly, computational speeds may be limited by the speed of processing memory access requests and/or the size of the cache available for distributing the retrieved data.

In accordance with the present disclosure, the computing device 100 further includes a set of bridges 214, which may be considered part of the bank 102 or external to the bank 102. Each bridge 214 is configured to connect a designated channel 212 (or a pair of channels 212 according to the stacked memory structure of the HBM 210) of the HBM 210 to a designated set of the PEs 200 in the bank 102. Preferably, each bridge 214 may be configured to one designated channel 212, and hence the number of bridges 214 in the set may correspond to the number of channels 212. Thus, rather than returning the retrieved data values to a centralized cache, each channel 212 may provide the retrieved data values to the corresponding bridge 214 for transmission to the respective target destinations. Accordingly, each channel 212 may retrieve data independently, and the bandwidth of data processing may be increased according to the capacity of each of the bridges 214.

Furthermore, in typical memory access requests, a requesting source may request a particular data value and once the data value is retrieved, the data value is returned to the requesting source. In accordance with the present disclosure, each channel 212 of the HBM is configured to serve a designated set of PEs 200, such that data values retrieved from the given channel 212 are returned to one of the PEs 200 in the designated set to complete the processing operation. Preferably, transmission of the retrieved data value is returned to the requesting source via a shortest path. Thus, the set of PEs 200 to which the retrieved data values are returned from a given channel 212 may preferably be oriented along a designated vector 216 corresponding to a single row or column of connected PEs 200 (e.g., according to the orientation of the HBM 210 relative to the bank 102). That is, each bridge 214 may connect the designated channel 212 to a designated vector 216 of PEs 200. Accordingly, the device 100 may include more than one HBM 210 based on the size of the array of PEs 200 in the bank 102 to allow each channel of an HBM 210 to service one column or row of PEs 200. In still further examples, the device 100 may include HBMs 210 located on opposing edges of the array of PEs 200 in the bank, such that each HBM 210 services half of a row or column of the PEs 200. Other arrangements of the HBMs 210 relative to the bank 102 are also contemplated.

In particular, if the HBM 210 spans a plurality of columns of the bank 102, then each channel 212 may preferably correspond to a column-wise vector 216 of PEs 200 in the bank 102. In some examples, the vector 216 may span an entirety of the column or row of PEs 200 in the bank 102, while in other examples, the vector 216 may span a portion of the column or row of PEs 200 in the bank 102. For example, the bank 102 may include two HBMs 210, each spanning the plurality of the columns of the PEs 200 in the bank 102 at opposing ends of the columns (or rows) of the PEs 200. In such an example, the designated vectors 216 may span half of the respective column (or row) of PEs 200.

Each bridge 214 may therefore be configured to receive retrieved data values from the corresponding designated channel 212 and pass them to the connected vector 216 of PEs 200. Accordingly, rather than the PEs 200 themselves being the sources of the data value request, each bridge may further include a bridge controller 218 configured to coordinate the data retrieval requests and pass the retrieved data values to the PEs 200. That is, such a system may leverage the processing equivalency of each of the PEs 200 to process the data provided to the PE 200, rather than requiring that each PE 200 process a particular data value. Each PE 200 may therefore simply process the data value provided to obtain a result, rather than identifying a data value to process, generating a request for the data value, and subsequently processing the retrieved data value. Further, the distance that the retrieved data value is transmitted after retrieval may be reduced by selection of the target destination by the bridge controller 218 after the retrieval from the HBM 210.

For example, the bridge controller 218 may be a microcontroller, microprocessor, or other suitable processing device capable of executing instructions to carry out the functionality described herein. For example, the bridge controller 218 may be a RISC V microcontroller. The bridge controller 218 may therefore be configured to initiate data retrieval requests and distribute the retrieved data values to the PEs 200 in the connected vector 216. For example, the bridge controller 218 may generate DMA descriptors indicating data values to be retrieved from the HBM 210.

Each bridge 214 may further include a direct memory access (DMA) module 220 configured to process DMA descriptors to retrieve the data, in particular, from the corresponding channel 212 of the HBM 210. The DMA module 220 may be integrated with the bridge controller 218 or may be an independent module.

Generally, the bridge controller 218 may be configured to identify a set of data values within the channel 212 to be retrieved and processed. The bridge controller 218 may generate DMA descriptors for the DMA module 220 to process to retrieve the target data values from the corresponding channel 212 of the HBM 210. The DMA controller 220 may then effect the retrieval of the target data values from the corresponding channel 212 of the HBM 210.

During the retrieval operation as described above, the operation of generating DMA descriptors by the DMA module 220 may take time, and the operation of processing the DMA descriptors by the HBM 210 to retrieve the target data values may also take time. Accordingly, to optimize the data retrieval and the available bandwidth of the HBM 210, while the set of DMA descriptors is being processed by the DMA module 220 to retrieve the data values from the HBM 210 (and more particularly the corresponding channel 212), the bridge controller 218 may be configured to generate a second set of DMA descriptors for a corresponding subsequent second set of target data values to be retrieved.

For example, the bridge controller 218 may be configured to generate DMA descriptors in sets of a predetermined number, which may preferably be proportional to the number of PEs 200 in the vector 216. For example, each set of DMA descriptors may include the number of PEs 200 in the vector 216. After generating the predetermined number of DMA descriptors, the bridge controller 218 may be configured to pass the set of DMA descriptors to the DMA module 220 to effect the retrieval of the target values from the HBM 210. While the DMA module 220 is processing the set of DMA descriptors, the bridge controller 218 may be configured to prepare a second set of DMA descriptors of the predetermined number. Thus, the DMA descriptor preparation by the bridge controller 218 and the retrieval of data values based on DMA descriptors by the DMA module 220 may happen concurrently. The bridge controller 218 and the DMA module 220 may therefore be configured to prepare and process sets of DMA descriptors in a continuously successive, round-robin fashion.

Figure 3:
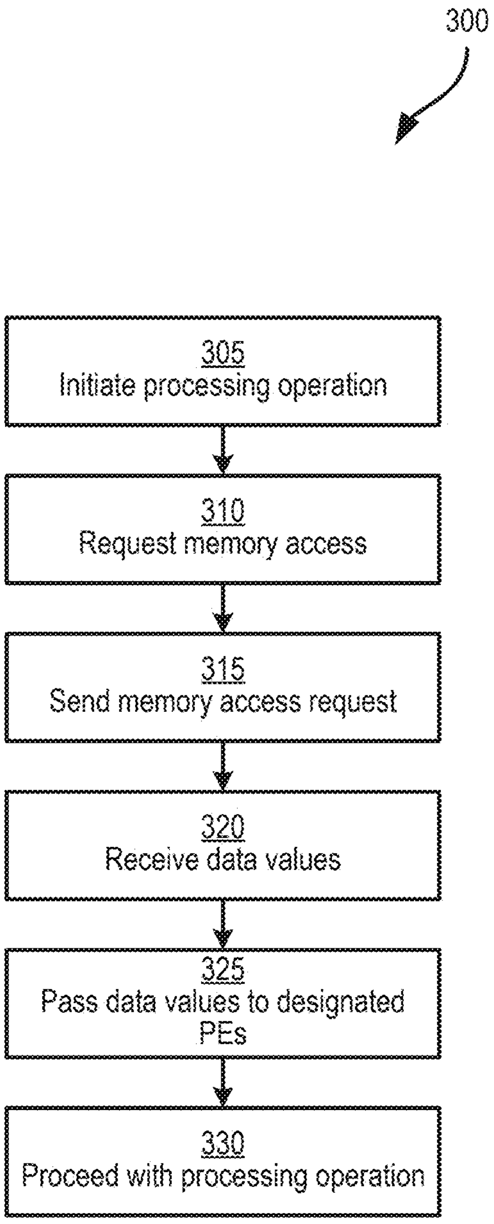
FIG. 3 depicts a flowchart of an example method of performing a processing operation with a memory access request from a high bandwidth memory.

Turning now to FIG. 3, the functionality implemented by the device 100 will be discussed in greater detail. FIG. 3 illustrates a method 300 of processing memory access requests. The method 300 will be discussed in conjunction with its performance by the device 100, with reference to the components of FIGS. 1 and 2. In other examples, the method 300 may be performed by other suitable devices or systems.

At block 305, the device 100 is configured to initiate a processing operation, such as generating a response to an LLM prompt, or the like. As part of the processing operation, the device 100 may require one or more data values to be retrieved for performing calculations or the like. In particular, to respond to an LLM prompt, many data values (e.g., vectors and/or tokens representative of words) may be required to generate a suitable response.

Accordingly, at block 310, the device 100, and in particular, the controller 208 may initiate a request for a memory access to retrieve one or more data values. In particular, since the bridges 214 are configured to manage the memory access requests and distribute the resulting retrieved data values to the PEs 200, the controller 208 may send the request for the memory access(es) to the bridges 214. In particular, the controller 208 may send particular memory access requests to the bridges 214 according to the channel 212 where the data value is stored. In other examples, the controller 208 may send the memory access requests to one of the bridges 214, which may, for example via the bridge controller 218, self-select the suitable data values to be retrieved from its corresponding connected channel 212, and then send the remaining memory access requests to the subsequent bridge 214. That is, the bridges 214 and the bridge controllers 218 may cooperate and self-organize to assign suitable memory access requests according to the data values stored in the corresponding connected channels 212 of the HBM 210.

In some examples, the controller 208 may additionally send processing instructions to the PEs 200 for processing the resulting data values when the PEs 200 receive the data values from the bridges 214. That is, the processing instructions sent to the PEs 200 may not include data retrieval request instructions, but rather simply data processing instructions.

At block 315, the device 100, and in particular, the bridges 214, receive the request for the memory accesses and processes the request.

Figure 4:
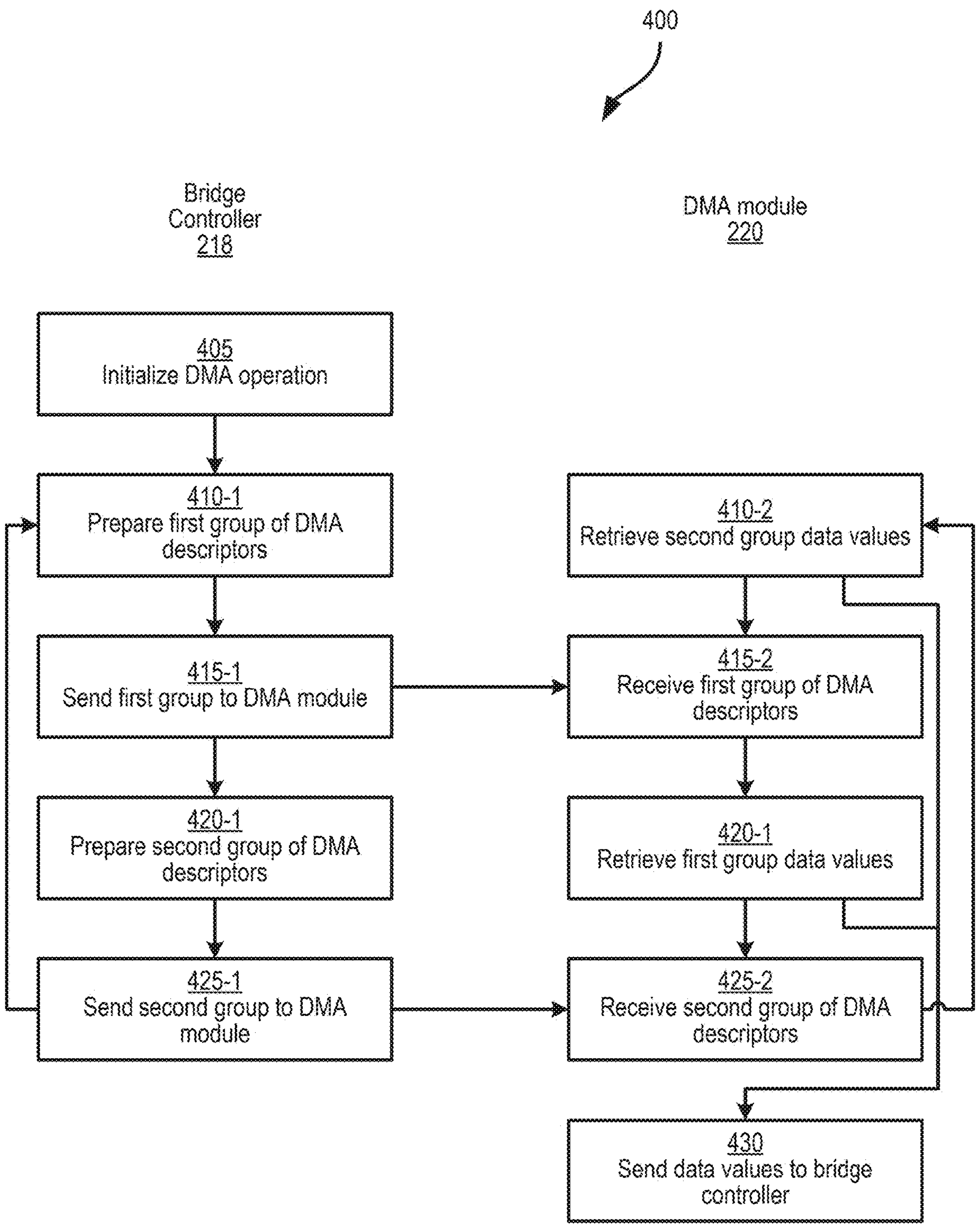
FIG. 4 depicts a flowchart of an example method of processing a memory access request by a bridge and a high bandwidth memory.

For example, referring to FIG. 4, a flowchart of an example method 400 of processing a memory access request is depicted. The method 400 will be discussed in conjunction with its performance in particular by bridge controller 218 in cooperation with the DMA module 220 of one of the bridges 214 to retrieve data values from the HBM 210, in particular at one of the channels 212. In other examples, the method 400 may be performed by other suitable devices and/or systems.

At block 405, a memory access operation at the bridge is initialized, for example, by the bridge controller 218. In particular, the bridge controller 218 may identify one or more data values to be retrieved.

At block 410-1, the bridge controller 218 may prepare a first group of DMA descriptors. In particular, the bridge controller 218 may prepare a predefined number of DMA descriptors for the predefined number of data values to be retrieved as part of the first group. For example, the predefined number of DMA descriptors may correspond to the number of PEs 200 in the designated vector 216 to which the bridge 214 is configured to distribute the retrieved data values.

At block 415-1, the bridge controller 218 is configured to send the first group of DMA descriptors to the DMA module 220 for processing. In particular, the bridge controller 218 may send the first group of DMA descriptors to be processed by the DMA module 220 for retrieval from the particular channel controller for the channel 212 with which the bridge 214 is associated.

At block 415-2, the DMA module 220 is configured to receive the first group of DMA descriptors from the bridge controller 218.

At block 420-2, in response to receiving the first group of DMA descriptors, the DMA module 220 may cooperate with a channel controller for the particular channel 212 to retrieve the target data values designated by the first group of DMA descriptors from the particular channel 212. After completing the retrieval of the target data values, the DMA module 220 is configured to proceed to block 430 to return the retrieved data values to the bridge controller 218.

Simultaneously with block 420-2, at block 420-1, the bridge controller 218 is configured to prepare a second group of DMA descriptors. The second group of DMA descriptors may similarly be for the predefined number of data values to be retrieved as part of the second group.

After completing blocks 420-1 and 420-2, respectively, the bridge controller 218 is configured to proceed to block 425-1 to send the second group of DMA descriptors to the DMA module 220, which in turn receives the second group of DMA descriptors at block 425-2.

The DMA module 220 may then return to block 410-2 to retrieve the target data values designated by the second group of DMA descriptors. In particular, a channel controller for the channel 212 corresponding to the bridge 214 may act on the DMA descriptors to retrieve the target data values. After completing the retrieval of the target data values, the DMA module 220 is configured to proceed to block 430 to send the retrieved data values to the bridge controller 218.

In particular, the DMA module 220 may perform block 410-2 substantially simultaneously to the bridge controller 218 returning to block 410-1 to prepare a subsequent first group of DMA descriptors. Thus, the bridge controller 218 and the DMA module 220 may cooperate to prepare and retrieve data values from the first group and the second group in a round-robin fashion to optimize the continuous retrieval of the target data values from the HBM 210.

Returning now to FIG. 3, at block 320, the bridge 214 is configured to receive the retrieved data values, for example from the HBM 210.

At block 325, the bridge 214, and in particular the bridge controller 218 is configured to pass the data values received at block 320 to the designated PEs 200. For example, since the designated PEs 200 may preferably be connected in a single row or column forming the vector 216, the bridge controller 218 may provide pass the data values to the first connected PE 200 to subsequently pass to the next connected PE 200 in the vector 216, and so on, until each of the PEs 200 has received a data value, or until each data value in the recently retrieved data values has been passed to one PE 200.

In particular, since the request for the memory access is initiated at the bridge 214 itself, rather than at the PEs 200, the data values received at block 320 may simply be passed to the designated PEs 200. That is, the bridge controller 218 may have a reduced requirement for organization and arrangement of the data values to be passed to particular PEs 200 based on the originating source of the memory access request, and instead may pass the data values in the order received.

Accordingly, at block 330, having distributed a data value to at least some of the PEs 200, the device 100, and in particular the controller 208, may proceed with the processing operation. That is, the controller 208 may cause the PEs 200 to execute some processing instruction(s) on the data value assigned to the respective PEs 200. Preferably, the PEs 200 may perform the same processing instruction in accordance with the SIMD architecture of the device 100.

Thus, a computing device as described herein may be configured with HBMs and a set of bridges, with one bridge corresponding to each channel of the HBM. Each bridge may connect the corresponding channel of the HBM to a designated set, and preferably, a designated vector of processing elements. Generally, the processing elements may be configured to perform a processing operation on a data value, and the results from each of the processing elements may be accumulated, for example to generate a response to a LLM prompt.

As described herein, the bridges may include a bridge controller, and the computational capacity of the bridge controller may be leveraged to move the coordination of memory access requests away from individual processing elements, and instead to the bridge controller to manage for the designated set or vector of processing elements. Accordingly, the subsequent distribution of data values may be simplified, since particular data values do not need to be distributed to specific requesting processing element sources.

The data access requests may further be coordinated by the bridge controllers such that the bridge controllers are initiating direct memory access requests corresponding to the connected channel of the HBM. Therefore the DMA request and the distribution of the data values may be optimized to the shortest path. Still further, as described herein, DMA descriptors may be prepared and processed in alternating sets, which alternate being generated by the bridge controller and being processed by a DMA module in cooperation with the corresponding channel to retrieve the target data values specified therein.

The scope of the claims should not be limited by the embodiments set forth in the above examples but should be given the broadest interpretation consistent with the description as a whole.

The invention claimed is:

1. A computing device comprising:
- a bank of processing elements;
- a high bandwidth memory module in communication with the bank of processing elements and including a plurality of channels of memory;
- a plurality of bridges corresponding to the plurality of channels of memory, each bridge including a bridge controller and a direct memory access (DMA) module, each bridge configured to connect a designated channel of the channels of memory to a designated vector of processing elements in the bank, the designated vector including a predefined number of the processing elements;
- wherein each bridge controller is configured to:
  - in response to a request for a memory access for a processing operation, generate, by the bridge controller, a first subset of DMA descriptors to retrieve a first subset of data values from the designated channel according to the request, the first subset of DMA descriptors having the predefined number of DMA descriptors corresponding to the predefined number of processing elements and send the first subset of DMA descriptors to the DMA module for retrieval;

while the first subset of DMA descriptors is being processed by the DMA module for retrieval of the data values from the designated channel, generate a second subset of DMA descriptors having the predefined number of DMA descriptors corresponding to the predefined number of processing elements in the designated vector;

receive, from the DMA module, the first subset of data values corresponding to the first subset of DMA descriptors; and distribute the first subset of data values to the processing elements in the designated vector to process according to the processing operation.

2. The computing device of claim 1, wherein the bridge controller is configured to:

in response to receiving the first subset of data values, send the second subset of DMA descriptors to the DMA module for retrieving a second subset of data values corresponding to the second subset of DMA descriptors; and while the second subset of DMA descriptors is being processed by the DMA module for retrieval of the data values from the designated channel, generate a third subset of DMA descriptors having the predefined number of DMA descriptors corresponding to the predefined number of processing elements in the designated vector.

3. The computing device of claim 1, wherein the designated vector corresponds to a portion of a column of the processing elements in the bank.

4. The computing device of claim 1, further comprising a controller, wherein the controller is configured to:

initiate the processing operation;

send the request for the memory access to the plurality of bridges; and send a processing instruction to the bank of processing elements to process the data value in accordance with the processing operation upon receipt of the data value.

5. The computing device of claim 1, wherein the plurality of bridges are configured to cooperate to assign the memory access request according to the data values stored in the corresponding designated channel.

6. The computing device of claim 5, wherein each bridge controller is configured to self-select, from the memory access request, the data values stored in the designated channel corresponding to the bridge.

7. A method comprising:

initiating, at a controller, a processing operation;

receiving, at a bridge controller of a bridge, a memory access request, the bridge connected a designated channel of a high bandwidth memory to a designated vector of processing elements having a predefined number of processing elements;

generating, by the bridge controller, a first subset of direct memory access (DMA) descriptors for retrieving a first subset of target data values from the designated channel of the high bandwidth memory, the first subset of DMA descriptors having the predefined number of DMA descriptors corresponding to the predefined number of processing elements;

sending, by the bridge controller, the first subset of DMA descriptors to a DMA module of the bridge to retrieve the first subset of target data values based on the first subset of DMA descriptors;

while the first subset of DMA descriptors is being processed by the DMA module for retrieval of the data values from the designated channel, generating, by the bridge controller, a second subset of DMA descriptors having the predefined number of DMA descriptors corresponding to the predefined number of processing elements in the designated vector;

receiving, at the bridge controller from the DMA module, the first subset of target data values corresponding to the first subset of DMA descriptors; and distributing the first subset of target data values to the processing elements in the designated vector to process according to the processing operation.

8. The method of claim 7, wherein processing the memory access request comprises: coordinating, by a set of bridges, assignment of the memory access request according to the data values stored in the designated channel.

9. The method of claim 8, wherein coordinating the assignment of the memory access request comprises self-selecting, by each given bridge controller of the bridges in the set, the data values stored in the designated channel corresponding to the bridge of the given bridge controller.

10. The method of claim 7, further comprising:

in response to receiving the first subset of target data values, sending, by the bridge controller, the second subset of DMA descriptors to the DMA module for retrieving a second subset of target data values corresponding to the second subset of DMA descriptors; and while the second subset of DMA descriptors is being processed by the DMA module for retrieval of the data values from the designated channel, generating, by the bridge controller, a third subset of DMA descriptors having the predefined number of DMA descriptors corresponding to the predefined number of processing elements in the designated vector.

* * * * *